(12) United States Patent
Sawada

(10) Patent No.: US 10,294,909 B2
(45) Date of Patent: May 21, 2019

(54) ENGINE CONTROL DEVICE

(71) Applicant: SUZUKI MOTOR CORPORATION, Hamamatsu-shi, Shizuoka (JP)

(72) Inventor: Toru Sawada, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/868,292

(22) Filed: Jan. 11, 2018

(65) Prior Publication Data

US 2018/0195486 A1 Jul. 12, 2018

(30) Foreign Application Priority Data

Jan. 12, 2017 (JP) ................. 2017-003180

(51) Int. Cl.
| | |
|---|---|
| *F02P 5/00* | (2006.01) |
| *F02P 5/04* | (2006.01) |
| *F02P 5/15* | (2006.01) |
| *F02D 37/02* | (2006.01) |
| *F02D 41/00* | (2006.01) |
| *F02D 41/12* | (2006.01) |
| *F02D 41/24* | (2006.01) |

(52) U.S. Cl.
CPC ............. *F02P 5/045* (2013.01); *F02D 37/02* (2013.01); *F02D 41/0002* (2013.01); *F02D 41/123* (2013.01); *F02D 41/2422* (2013.01); *F02P 5/15* (2013.01); *F02P 5/1502* (2013.01); *F02D 2200/0404* (2013.01); *F02D 2200/101* (2013.01); *F02D 2200/602* (2013.01); *F02D 2250/21* (2013.01); *Y02T 10/42* (2013.01); *Y02T 10/46* (2013.01)

(58) Field of Classification Search
CPC ............ F02D 37/02; F02P 5/00; F02P 5/1504
USPC .............. 123/406.11, 406.47, 406.5, 406.51, 123/406.52, 406.53
See application file for complete search history.

(56) References Cited

U.S. PATENT DOCUMENTS

| | | | |
|---|---|---|---|
| 2009/0228187 A1* | 9/2009 | Nakamura | .............. F01L 1/022 701/103 |
| 2010/0036581 A1* | 2/2010 | Ohtsuka | .................. F02D 37/02 701/102 |
| 2010/0071658 A1* | 3/2010 | Soejima | ................ F01N 3/0842 123/406.19 |
| 2010/0268436 A1* | 10/2010 | Soejima | ................ F02D 11/105 701/102 |

FOREIGN PATENT DOCUMENTS

JP H 10-115275 A 5/1998

* cited by examiner

*Primary Examiner* — John Kwon
(74) *Attorney, Agent, or Firm* — Stein IP, LLC

(57) ABSTRACT

An engine control device includes: an electronically controlled throttle which controls a flow rate of air-fuel mixture flowing into a cylinder of an engine by controlling a throttle opening angle electronically; an ignition device which ignites an air-fuel mixture existing in the cylinder; and an engine control unit which executes an ignition timing/throttle opening angle changing process of controlling the ignition device and the electronically controlled throttle while an operation of a body to be driven by the engine is in a steady state so as to advance a timing of ignition of an air-fuel mixture existing in the cylinder and to reduce the throttle opening angle while torque of the engine is kept constant.

20 Claims, 3 Drawing Sheets

ENGINE CONTROL DEVICE

CROSS-REFERENCE TO RELATED APPLICATIONS

This application claims the benefit of Japanese Patent Application JP 2017-003180, filed Jan. 12, 2017, the entire content of which is hereby incorporated by reference, the same as if set forth at length.

FIELD OF THE INVENTION

The present invention relates to an engine control device for controlling the engine ignition timing and the throttle opening angle.

BACKGROUND OF THE INVENTION

The fuel efficiency of a vehicle can be increased by advancing the engine ignition timing while it is running. JP-A-10-115275 discloses an ignition timing control device that advances the ignition timing depending on which of prescribed speed ranges the current speed of the vehicle falls in if a prescribed high-speed running condition is satisfied.

SUMMARY OF THE INVENTION

For example, while a vehicle is cruising, it is desirable to advance the engine ignition timing further to attain further increase in fuel efficiency. However, the engine torque is increased if the ignition timing comes close to an MBT (minimum advance for the best torque) by advancing the ignition timing. This may lower the maneuverability of the vehicle (e.g., the vehicle accelerates though the driver is keeping the accelerator pedal at the same position, as a result of which the driver feels strange).

The present invention has been made in view of the above problem, and an object of the invention is therefore to provide an engine control device that enables further advancement of the engine ignition timing without lowering the maneuverability of a body to be driven such as a vehicle.

An engine control device of the invention comprises: an electronically controlled throttle which controls a flow rate of air-fuel mixture flowing into a cylinder of an engine by controlling a throttle opening angle electronically; an ignition device which ignites an air-fuel mixture existing in the cylinder; and an engine control unit which executes an ignition timing/throttle opening angle changing process of controlling the ignition device and the electronically controlled throttle while the operation of a body to be driven by the engine is in a steady state so as to advance the timing of ignition of an air-fuel mixture existing in the cylinder and to reduce the throttle opening angle while torque of the engine is kept constant.

The invention makes it possible to enable further advancement of the engine ignition timing without lowering the maneuverability of a body to be driven such as a vehicle.

DESCRIPTION OF SYMBOLS

Figure 1:
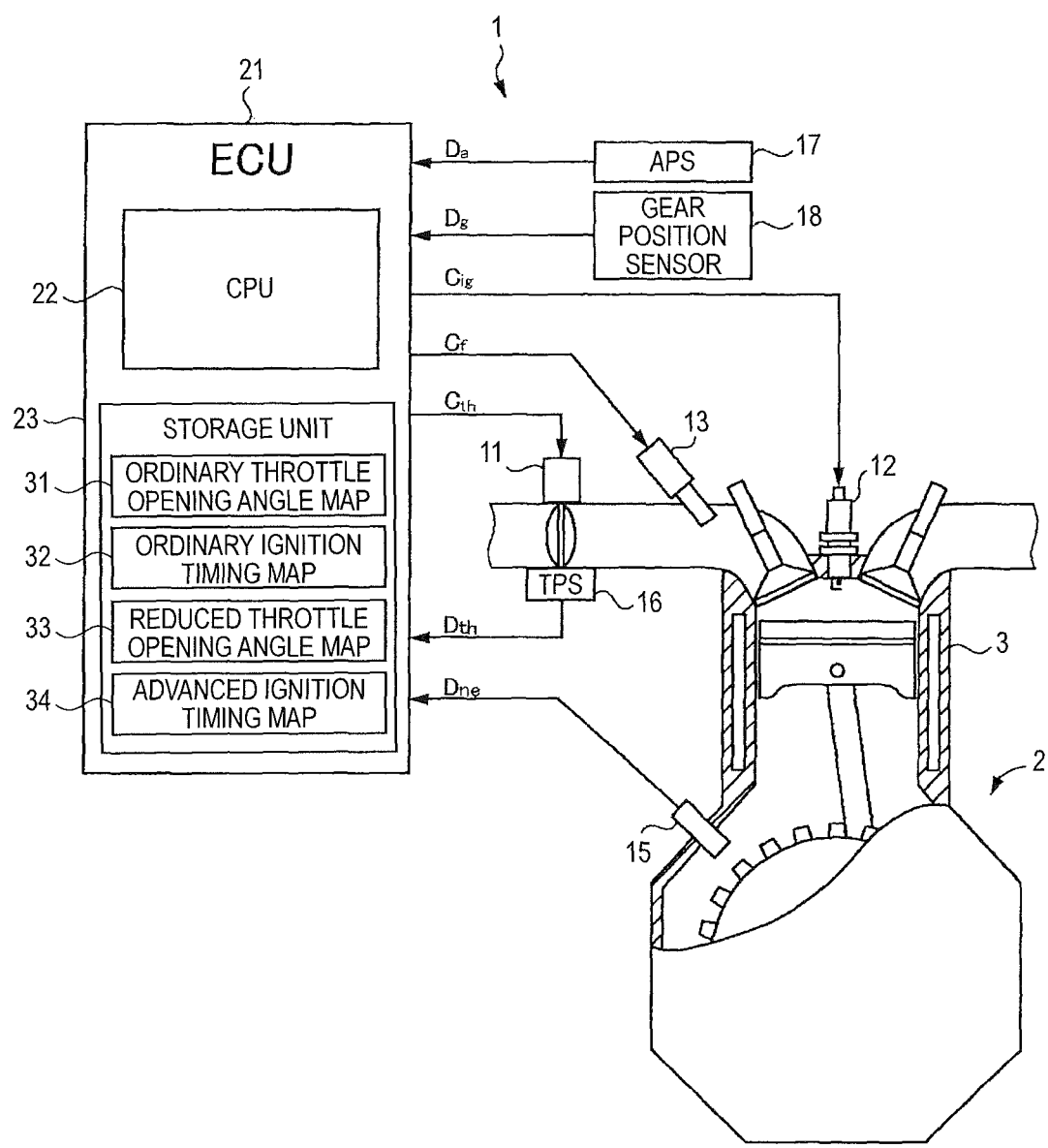
FIG. 1 is a diagram illustrating an engine control device according to an embodiment of the present invention together with an engine.

1: Engine control device
2: Engine
11: Electronically controlled throttle
12: Ignition device
13: Fuel control device
15: Crank angle sensor (engine rotation speed detection unit)
16: Throttle position sensor (throttle opening angle detection unit)
17: Accelerator position sensor (accelerator position detection unit)
21: Engine control unit
23: Storage unit
31: Ordinary throttle opening angle map (ignition timing/throttle opening angle target information)
32: Ordinary ignition timing map (ignition timing/throttle opening angle target information)
33: Reduced throttle opening angle map (ignition timing/throttle opening angle target information)
34: Advanced ignition timing map (ignition timing/throttle opening angle target information)

DETAILED DESCRIPTION OF THE INVENTION

An engine control device according to the present invention is equipped with an electronically controlled throttle which controls the flow rate of air-fuel mixture flowing into a cylinder of an engine by controlling a throttle opening angle electronically, an ignition device which ignites an air-fuel mixture existing in the cylinder, and an engine control unit which executes an ignition timing/throttle opening angle changing process while the operation of a body to be driven by the engine (e.g., vehicle) is in a steady state. The ignition timing/throttle opening angle changing process is a process of controlling the ignition device and the electronically controlled throttle so as to advance the timing of ignition of an air-fuel mixture existing in the cylinder and to reduce the throttle opening angle while the torque of the engine is kept constant.

In the ignition timing/throttle opening angle changing process, the engine control unit advances the ignition timing while reducing the throttle opening angle to lower the flow rate of an air-fuel mixture flowing into the cylinder. Reducing the throttle opening angle serves to decrease the engine torque by the same amount as advancing the ignition timing serves to increase the engine torque, whereby the engine torque is kept constant. Since in this manner increase of the engine torque is prevented though the ignition timing is advanced, a phenomenon can be prevented that a body to be driven by the engine is accelerated though the driver is keeping the accelerator pedal at the same position. As a result, further advancement of the engine ignition timing is enabled without lowering the maneuverability of a body to be driven by the engine and the fuel efficiency is thereby increased further.

(Engine Control Device)

FIG. 1 illustrates an engine control device 1 according to an embodiment of the invention together with an engine 2.

The engine 2 and the engine control device 1 shown in FIG. 1 are installed in a vehicle such as a motorcycle. The engine control device 1 has a function of controlling the ignition timing of the engine 2 and the throttle opening angle according to the running state of the vehicle.

The engine control device 1 is equipped with an electronically controlled throttle 11, an ignition device 12, a fuel injection device 13, a crank angle sensor 15 as an engine rotation detection unit, a throttle position sensor (TPS) 16 as a throttle opening angle detection unit, an accelerator position sensor (APS) 17 as an accelerator position detection unit, a gear position sensor 18, and an engine control unit (ECU) 21.

The electronically controlled throttle 11 is a device for controlling the flow rate of an air-fuel mixture flowing into the engine 2 by controlling the throttle opening angle electronically. The electronically controlled throttle 11 can vary the throttle opening angle, that is, the opening angle of a throttle valve provided at a halfway position in an air intake passage that leads to an intake port of the engine 2, by driving a motor according to a control signal $C_{th}$ that is output from the engine control unit 21.

The ignition device 12 is a device for igniting the air-fuel mixture existing in a cylinder 3. Although FIG. 1 is simplified in that only an ignition plug is drawn as the ignition device 12, the ignition device 12 includes known components for igniting an air-fuel mixture by generating an electric spark such as the ignition plug and an ignition coil. The ignition timing of the ignition device 12 is controlled by a control signal $C_{ig}$ that is output from the engine control unit 21.

The fuel injection device 13 is a device for injecting fuel into air being supplied to the cylinder 3. The fuel injection rate, the fuel injection time, etc. of the fuel injection device 13 are controlled by a control signal $C_f$ that is output from the engine control unit 21.

The crank angle sensor 15 is a device for detecting a rotation speed of the engine 2 (engine rotation speed). The crank angle sensor 15 outputs a detection signal $D_{ne}$ corresponding to an engine rotation speed to the engine control unit 21.

The throttle position sensor 16 is a device for detecting a throttle opening angle of the electronically controlled throttle 11. The throttle position sensor 16 outputs a detection signal $D_{th}$ indicating a throttle opening angle to the engine control unit 21.

An accelerator position sensor 17 is a device for detecting an accelerator position. The accelerator position sensor 17 is attached to, for example, an accelerator grip of the motorcycle. The accelerator position sensor 17 outputs a detection signal $D_a$ indicating an accelerator position corresponding to, for example, a manipulation amount of the accelerator grip to the engine control unit 21.

The gear position sensor 18 is a device for detecting a gear position of a transmission (not shown) provided in the vehicle. The gear position sensor 18 outputs a detection signal $D_g$ indicating a gear position to the engine control unit 21.

The engine control unit 21 is equipped with a central processing unit (CPU) 22 and a storage unit 23 having a nonvolatile storage device, for example. The engine control unit 21 can recognize an engine rotation speed on the basis of the detection signal $D_{ne}$ that is output from the crank angle sensor 15 and recognize a throttle opening angle on the basis of the detection signal $D_{th}$ that is output from the throttle position sensor 16. The engine control unit 21 can also recognize an accelerator position on the basis of the detection signal $D_a$ that is output from the accelerator position sensor 17 and recognize a gear position on the basis of the detection signal $D_g$ that is output from the gear position sensor 18.

The engine control unit 21 can control the throttle opening angle and the ignition timing by outputting the control signals $C_{th}$ and $C_{ig}$ to the electronically controlled throttle 11 and the ignition device 12, respectively. The engine control unit 21 can also control the fuel injection rate, the fuel injection time, suspension of fuel injection (injection cutting), etc. by outputting the control signal $C_f$ to the fuel injection device 13.

The engine control unit 21 also executes an ordinary throttle opening angle control process, an ordinary ignition timing control process, a fuel cutting control process, and an ignition timing/throttle opening angle changing process.

The ordinary throttle opening angle control process is a process of controlling the throttle opening angle according to the engine rotation speed and the accelerator position. The ordinary throttle opening angle control process makes it possible to adjust, according to the engine rotation speed, how the throttle opening angle should be varied according to a variation of the accelerator position. This makes it possible to increase the maneuverability of the vehicle.

More specifically, in the ordinary throttle opening angle control process, the engine control unit 21 determines a throttle opening angle on the basis of an engine rotation speed detected by the crank angle sensor 15 and an accelerator position detected by the accelerator position sensor 17 by referring to an ordinary throttle opening angle map 31. And the engine control unit 21 controls the electronically controlled throttle 11 so that the actual throttle opening angle of the electronically controlled throttle 11 becomes equal to the thus-determined throttle opening angle. The ordinary throttle opening angle map 31 is a three-dimensional map indicating a relationship between the engine rotation speed, the accelerator position, and the throttle opening angle, and is stored in the storage unit 23.

On the other hand, the ordinary ignition timing control process is a process of advancing or delaying the ignition timing on the basis of the engine rotation speed and the throttle opening angle. For example, the ordinary ignition timing control process can increase the fuel efficiency by advancing the ignition timing in a range that the engine rotation speed is high and the throttle opening angle is small. The ordinary ignition timing control process can also suppress knocking by delaying the ignition timing when the throttle opening angle is large.

More specifically, in the ordinary ignition timing control process, the engine control unit 21 determines ignition timing on the basis of an engine rotation speed detected by the crank angle sensor 15 and a throttle opening angle detected by the throttle position sensor 16 by referring to an ordinary ignition timing map 32. And the engine control unit 21 controls the ignition device 12 so that it ignites an air-fuel mixture with the thus-determined ignition timing. The ordinary ignition timing map 32 is a three-dimensional map indicating a relationship between the engine rotation speed, the throttle opening angle, and the ignition timing, and is stored in the storage unit 23.

In the embodiment, as described above, a throttle opening angle to be used for determining ignition timing in the ordinary ignition timing control process is detected by the throttle position sensor 16. Alternatively, a throttle opening angle to be used for determining ignition timing in the ordinary ignition timing control process may be determined on the basis of an engine rotation speed detected by the crank angle sensor 15, an accelerator position detected by the accelerator position sensor 17, and the ordinary throttle opening angle map 31.

The fuel cutting control process is a process of suspending the supply of fuel to the fuel injection device 13 when the throttle opening angle has become very small and the misfire rate of the engine 2 has become high. The fuel cutting control process can prevent a phenomenon that unburnt gas flows to a catalyst unit of the exhaust system due to misfiring and damages the catalyst.

More specifically, in the fuel cutting control process, the engine control unit 21 compares a throttle opening angle detected by the throttle position sensor 16 with a throttle opening angle limit value. If the detected throttle opening angle is smaller than or equal to the throttle opening angle limit value, the engine control unit 21 performs a control of suspending the injection of fuel from the fuel injection device 13. The throttle opening angle limit value is a throttle opening angle threshold value for judgment as to whether to suspend fuel injection by the fuel cutting control process, and is stored in the storage unit 23.

The ignition timing/throttle opening angle changing process is a process of further advancing the ignition timing from timing determined by the ordinary ignition timing control process and further decreasing the throttle opening angle from an angle determined by the ordinary throttle opening angle control process. The ignition timing/throttle opening angle changing process can attain further increase in fuel efficiency. The ignition timing/throttle opening angle changing process will be described later in detail.

The engine control unit 21 executes various kinds of processes for controlling the driving of the engine 2 and the running of the vehicle in addition to the above-described processes. For example, the engine control unit 21 executes an idling control process for controlling the idling of the engine 2.

(Engine Control Process)

Figure 2:
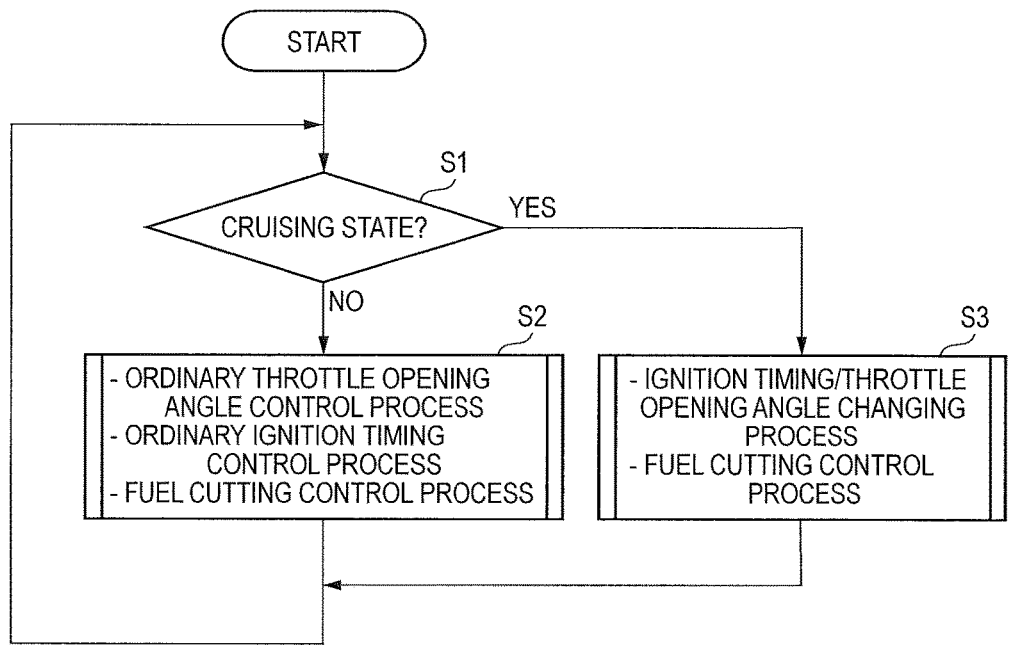
FIG. 2 is a flowchart of an engine control process that is executed by the engine control device according to the embodiment.

FIG. 2 shows the details of an engine control process that is executed by the engine control device 1. While the engine 2 is in operation, the engine control device 1 executes the engine control process shown in FIG. 2. In the engine control process, at step S1, the engine control unit 21 judges whether the vehicle is running at a constant speed, that is, it is in a cruising state. If the vehicle is not in a cruising state, at step S2 the engine control unit 21 executes the above-described ordinary throttle opening angle control process, ordinary ignition timing control process, and fuel cutting control process in parallel. On the other hand, if the vehicle is in a cruising state, at step S3 the engine control unit 21 executes the above-described ignition timing/throttle opening angle changing process and fuel cutting control process in parallel.

At step S1 shown in FIG. 2, the engine control unit 21 judges that the vehicle is in a cruising state if, for example, all of the following conditions (1) to (5) are satisfied.

(1) The engine rotation speed is approximately constant (e.g., the variation of the engine rotation speed in 0.1 sec is within a range of −150 rpm to +150 rpm).

(2) The throttle opening angle is larger than a prescribed value (e.g., 2%).

(3) The accelerator position is approximately constant (e.g., the variation of the accelerator position in 0.1 sec is within a range of −5% to +5%).

(4) The gear position is not at neutral.

(5) An idling control is not being performed.

The engine control unit 21 judges whether the above conditions are satisfied on the basis of the detection signal $D_{ne}$ that is output from the crank angle sensor 15, the detection signal $D_{th}$ that is output from the throttle position sensor 16, the detection signal $D_a$ that is output from the accelerator position sensor 17, the detection signal $D_g$ that is output from the gear position sensor 18, a flag indicating whether an idling control is being performed (i.e., a flag that is generated by the engine control unit 21 in the idling control process), and other information.

(Ignition Timing/Throttle Opening Angle Changing Process)

Figure 3:
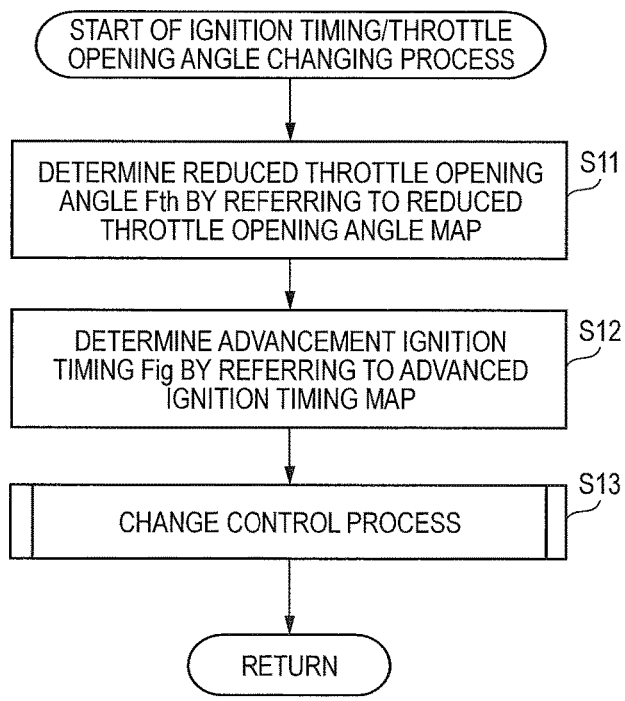
FIG. 3 is a flowchart of an ignition timing/throttle opening angle changing process that is executed by the engine control device according to the embodiment.

FIG. 3 shows the details of the ignition timing/throttle opening angle changing process which is executed at step S3 show in FIG. 2. In the ignition timing/throttle opening angle changing process, first, at step S11, the engine control unit 21 determines a reduced throttle opening angle $F_{th}$ on the basis of an engine rotation speed detection value $P_{ne}$ that is detected by the crank angle sensor 15 at a start of the ignition timing/throttle opening angle changing process and an accelerator position detection value $P_a$ that is detected by the accelerator position sensor 17 at the start of the ignition timing/throttle opening angle changing process by referring to a reduced throttle opening angle map 33 (described later). The reduced throttle opening angle $F_{th}$ is a final target throttle opening angle that is employed in further decreasing the throttle opening angle from an angle determined by the ordinary throttle opening angle control process.

At step S12, the engine control unit 21 recognizes a throttle opening angle recognition value $P_{th}$ at the start of the ignition timing/throttle opening angle changing process on the basis of the engine rotation speed detection value $P_{ne}$ at the start of the ignition timing/throttle opening angle changing process and the accelerator position detection value $P_a$ at the start of the ignition timing/throttle opening angle changing process by referring to the ordinary throttle opening angle map 31. The engine control unit 21 determines advanced ignition timing $F_{ig}$ on the basis of the engine rotation speed detection value $P_{ne}$ at the start of the ignition timing/throttle opening angle changing process and the throttle opening angle recognition value $P_{th}$ at the start of the ignition timing/throttle opening angle changing process by referring to an advanced ignition timing map 34 (described later). The advanced ignition timing $F_{ig}$ is final target ignition timing that is employed in further advancing the ignition timing from timing determined by the ordinary ignition timing control process.

At step S13, the engine control unit 21 executes a changing control process of decreasing the throttle opening angle gradually from the throttle opening angle at the start of the ignition timing/throttle opening angle changing process to the reduced throttle opening angle $F_{th}$ and advancing the ignition timing gradually to the advanced ignition timing $F_{ig}$ from timing at the start of the ignition timing/throttle opening angle changing process.

The reduced throttle opening angle map 33 is a three-dimensional map indicating a relationship between the engine rotation speed, the accelerator position, and the reduced throttle opening angle, and is stored in the storage unit 23. The advanced ignition timing map 34 is a three-dimensional map indicating a relationship between the engine rotation speed, the throttle opening angle, and the advanced ignition timing, and is stored in the storage unit 23. The reduced throttle opening angle map 33 and the advanced ignition timing map 34 are specific examples of the "ignition timing/throttle opening angle target information".

The reduced throttle opening angle map 33 and the advanced ignition timing map 34 will be described below in further detail. Now, for convenience of description, two terms "torque before a change to a reduced throttle opening angle and advanced ignition timing" and "torque after a change to a reduced throttle opening angle and advanced ignition timing" are defined. The "torque before a change to a reduced throttle opening angle and advanced ignition timing" is a torque of the engine 2 that is obtained when the actual throttle opening angle is set at a throttle opening angle recognition value $P_{th}$ that is recognized on the basis of an engine rotation speed detection value $P_{ne}$ that is detected at a certain time point while the vehicle is cruising, an accelerator position detection value $P_a$ detected at the same time point, and the ordinary throttle opening angle map 31 and the actual ignition timing is set to an ignition timing recognition value $P_{ig}$ that is determined on the basis of the engine rotation speed detection value $P_{ne}$ detected at the same time point, the throttle opening angle recognition value $P_{th}$ recognized at the same time point, and the ordinary ignition timing map 32.

The "torque after a change to a reduced throttle opening angle and advanced ignition timing" is a torque of the engine 2 that is obtained when the actual throttle opening angle is set at a reduced throttle opening angle $F_{th}$ that is determined on the basis of an engine rotation speed detection value $P_{ne}$ that is detected at a certain time point while the vehicle is cruising, an accelerator position detection value $P_a$ detected at the same time point, and the reduced throttle opening angle map 33 and the actual ignition timing is set to advanced ignition timing $F_{ig}$ that is determined on the basis of the engine rotation speed detection value $P_{ne}$ detected at the same time point, the throttle opening angle recognition value $P_{th}$ recognized at the same time point, and the advanced ignition timing map 34.

The reduced throttle opening angle map 33 and the advanced ignition timing map 34 are formed so that a "torque after a change to a reduced throttle opening angle and advanced ignition timing" that is obtained at any time point while the vehicle is cruising is always equal to a "torque before a change to a reduced throttle opening angle and advanced ignition timing" that is obtained at the same time point. As a result, the torque of the engine 2 remains the same even if the actual throttle opening angle and the actual ignition timing are changed to a reduced throttle opening angle $F_{th}$ and advanced ignition timing $F_{ig}$, respectively, by the ignition timing/throttle opening angle changing process at any time point while the vehicle is cruising.

For example, the reduced throttle opening angle map 33 and the advanced ignition timing map 34 are formed in the following manner. First, the vehicle is rendered in a cruising state. Then the engine rotation speed and the accelerator position are set at certain values and, in this state, a "torque before a change to a reduced throttle opening angle and advanced ignition timing" is measured. Then the ignition timing is advanced by a prescribed time while the engine rotation speed and the accelerator position are kept as they are. After that, the throttle opening angle is reduced until the torque of the engine 2 becomes equal to the "torque before a change to a reduced throttle opening angle and advanced ignition timing" while the engine rotation speed and the accelerator position are kept as they are and the ignition timing is kept equal to the advanced timing. When the torque of the engine 2 has become equal to the "torque before a change to a reduced throttle opening angle and advanced ignition timing," the engine rotation speed and the accelerator position at this time point are recorded, the ignition timing at this time point is recorded as advanced ignition timing, and the throttle opening angle at this time point is recorded as a reduced throttle opening angle.

The above set of operations is performed for substantially all combinations of an engine rotation speed and an accelerator position that are expected while the vehicle in a cruising state. A thus-recorded corresponding relationship between the engine rotation speed, the accelerator position, and the reduced throttle opening angle are converted into data that are in the form of a three-dimensional map, that is, a reduced throttle opening angle map 33.

Furthermore, throttle opening angles corresponding to the respective accelerator positions recorded by the above set of operations are determined using the ordinary throttle opening angle map 31, and a corresponding relationship between the thus-determined throttle opening angle, the thus-recorded engine rotation speed, and the thus-recorded advanced ignition timing are converted into data that are in the form of a three-dimensional map, that is, an advanced ignition timing map 34.

(Change Control Process)

Figure 4:
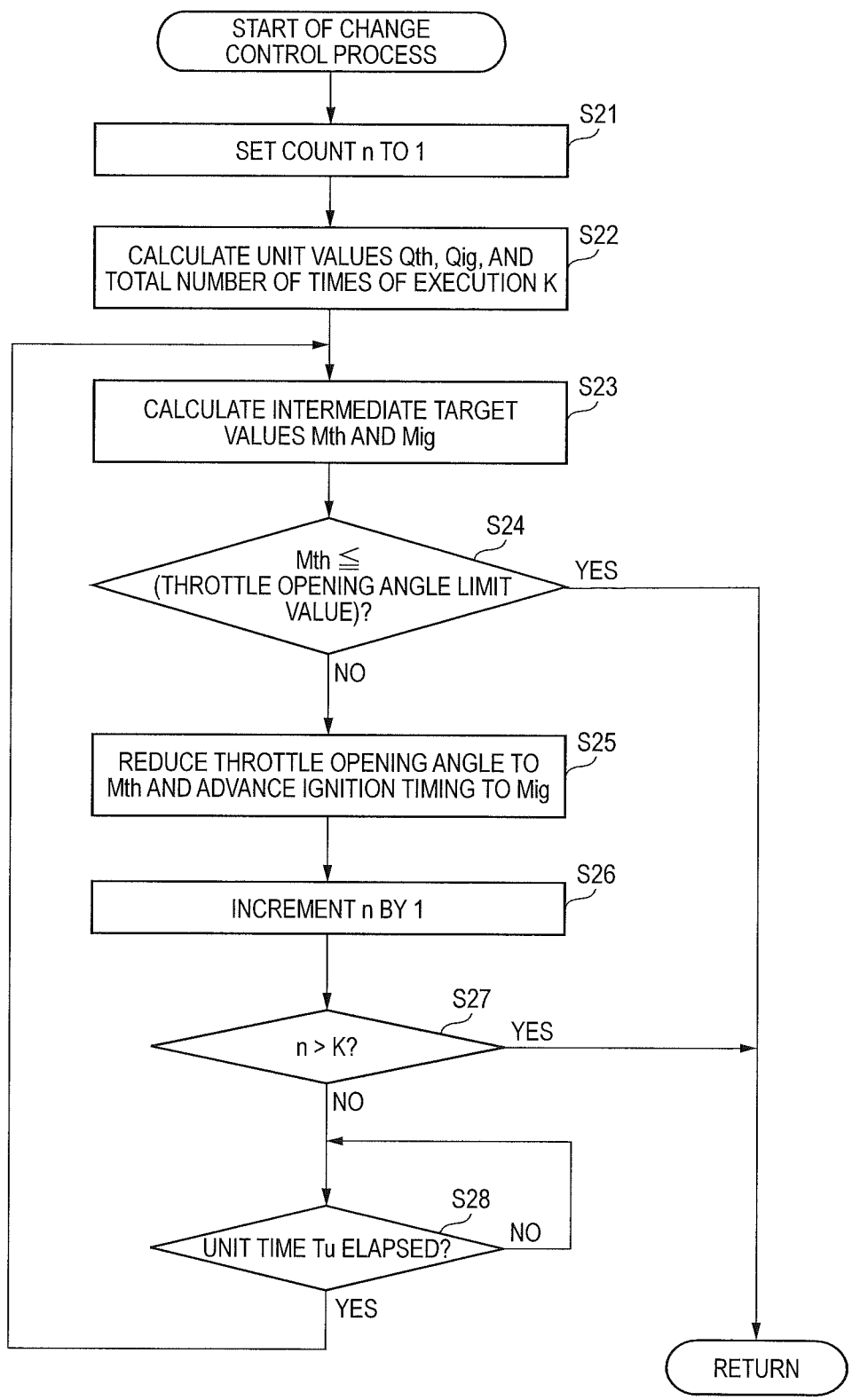
FIG. 4 is a flowchart of a change control process that is executed by the engine control device according to the embodiment.

FIG. 4 shows the details of the change control process which is executed at step S13 shown in FIG. 3. The change control process is a process in which a tailing process, relating to the throttle opening angle, of reducing the throttle opening angle gradually from an angle at a start of the ignition timing/throttle opening angle changing process to a reduced throttle opening angle $F_{th}$ and a tailing process, relating to the ignition timing, of advancing the ignition timing gradually from timing at the start of the ignition timing/throttle opening angle changing process to advanced ignition timing $F_{ig}$ are executed at the same time. The change control process includes a process of limiting the actual throttle opening angle so that it does not become smaller than or equal to a threshold value (throttle opening angle limit value) of the throttle opening angle at which the fuel cutting control process is started.

In the change control process, first, at step S21, the engine control unit 21 sets a count n used in the change control process to "1."

At step S22, the engine control unit 21 calculates, according to the following Equations (2), (3), and (1), respectively, a reduction unit value $Q_{th}$ to be employed when the throttle opening angle is reduced gradually, an advancement unit value $Q_{ig}$ to be employed when the ignition timing is advanced gradually, and the number K of times the throttle opening angle is reduced by the unit value $Q_{th}$ and the ignition timing is advanced by the unit value $Q_{ig}$ (a total number of times of execution) on the basis of a time (execution time) $T_t$ it takes to reduce the throttle opening angle gradually from an angle at a start of the ignition timing/throttle opening angle changing process to a reduced throttle opening angle $F_{th}$ and to advance the ignition timing gradually from timing at the start of the ignition timing/throttle opening angle changing process to advanced ignition timing $F_{ig}$, a unit time $T_u$ of gradual reduction of the throttle opening angle and gradual advancement of the ignition timing, an engine rotation speed detection value $P_{ne}$ at the start of the ignition timing/throttle opening angle changing process, an accelerator position detection value $P_a$ at the start of the ignition timing/throttle opening angle changing process, a throttle opening angle recognition value $P_{th}$ at the start of the ignition timing/throttle opening angle changing process, the reduced throttle opening angle $F_{th}$, and the advanced ignition timing $F_{ig}$:

$$K = T_t / T_u \qquad (1)$$

$$Q_{th} = (P_{th} - F_{th}) / K \qquad (2)$$

$$Q_{ig} = (F_{ig} - P_{ig}) / K. \qquad (3)$$

In the embodiment, the execution time $T_t$ and the unit time $T_u$ are set in advance.

At step S23, the engine control unit 21 calculates a target value (intermediate target value) $M_{th}$ of reduction of the throttle opening angle by the unit value $Q_{th}$ and a target value (intermediate target value) $M_{ig}$ of advancement of the ignition timing by the unit value $Q_{ig}$ according to the following Equation (4) and (5), respectively, on the basis of the unit values $Q_{th}$ and $Q_{ig}$, the throttle opening angle recognition value $P_{th}$ at the start of the ignition timing/throttle opening angle changing process, the ignition timing recognition value $P_{ig}$ at the start of the ignition timing/throttle opening angle changing process, and a count n at the present time:

$$M_{th} = P_{th} - Q_{th} \times n \qquad (4)$$

$$M_{ig} = P_{ig} + Q_{ig} \times n. \qquad (5)$$

At step S24, the engine control unit 21 judges whether the intermediate target value $M_{th}$ calculated at step S23 is smaller than or equal to the throttle opening angle limit value.

If the intermediate target value $M_{th}$ is larger than the throttle opening angle limit value (S24: no), at step S25 the engine control unit 21 outputs a control signal $C_{th}$ for setting the throttle opening angle at the intermediate target value $M_{th}$ to the electronically controlled throttle 11 and outputs a control signal $C_{ig}$ to the ignition device 12 with such timing that the ignition timing becomes equal to the intermediate target value $M_{ig}$.

The engine control unit 21 increments the count n by 1 at step S26, and judges, at step S27, whether the count n is larger than the total number of times of execution K.

If the count n is not larger than the total number of times of execution K (S27: no), the engine control unit 21 waits for the unit time $T_u$ at step S28 and returns to step S23.

The engine control unit 21 executes steps S23 to S28 repeatedly as long as the intermediate target value $M_{th}$ is larger than the throttle opening angle limit value and the count n is not larger than the total number of times of execution K.

On the other hand, if the intermediate target value $M_{th}$ is smaller than or equal to the throttle opening angle limit value (S24: yes), the engine control unit 21 finishes the change control process. If the count n is larger than the total number of times of execution K, the engine control unit 21 also finishes the change control process.

As described above, according to the ignition timing/throttle opening angle changing process of the engine control device 1, while the vehicle is cruising, the ignition timing can be advanced further from timing determined by the ordinary ignition timing control process. This makes it possible to increase the fuel efficiency of the vehicle further. Although the fuel efficiency of the vehicle can be increased by advancing the ignition timing by the ordinary ignition timing control process, the fuel efficiency of the vehicle can be made even higher by advancing, by the ignition timing/throttle opening angle changing process, the ignition timing further from timing determined by the ordinary ignition timing control process than in a case that only the ordinary ignition timing control process is executed.

According to the ignition timing/throttle opening angle changing process of the engine control device 1, while the vehicle is cruising, the torque of the engine 2 can be kept constant by advancing the ignition timing further from timing determined by the ordinary ignition timing control process and, at the same time, reducing the throttle opening angle further from an angle determined by the ordinary throttle opening angle control process. This makes it possible to prevent a phenomenon that the vehicle accelerates though the driver is keeping the accelerator pedal at the same position. Thus, the ignition timing can be advanced further from timing determined by the ordinary ignition timing control process to increase the fuel efficiency, without lowering the maneuverability of the vehicle.

In the change control process of the engine control device 1, although the throttle opening angle is reduced by the ignition timing/throttle opening angle changing process, the reduction of the throttle opening angle is limited so that the throttle opening angle does not become smaller than or equal to the throttle opening angle limit value (i.e., the throttle opening angle threshold value at which the fuel cutting control process is started). This makes it possible to prevent a phenomenon that the fuel cutting control process is executed because the throttle opening angle is reduced by the ignition timing/throttle opening angle changing process and, as a result, the torque of the engine 2 varies to make the manner of running of the vehicle unstable.

In the change control process of the engine control device 1, the throttle opening angle is reduced gradually from an angle at a start of the ignition timing/throttle opening angle changing process to a reduced throttle opening angle $F_{th}$ and the ignition timing is advanced gradually from timing at the start of the ignition timing/throttle opening angle changing process to advanced ignition timing $F_{ig}$ by executing the change control process. This makes it possible to prevent a phenomenon that the throttle opening angle or the ignition timing varies rapidly in the ignition timing/throttle opening angle changing process to lower the stability of running of the vehicle.

This will be described in more detail below. In the ignition timing/throttle opening angle changing process, a reduced throttle opening angle $F_{th}$ and advanced ignition timing $F_{ig}$ are determined so that the torque of the engine 2 remains the same even if the throttle opening angle and the ignition timing are changed. If the throttle opening angle were reduced instantaneously from an angle at a start of the ignition timing/throttle opening angle changing process toward the reduced throttle opening angle $F_{th}$ or the ignition timing were advanced instantaneously from timing at the start of the ignition timing/throttle opening angle changing process toward the advanced ignition timing $F_{ig}$, the torque of the engine 2 would vary to a large extent instantaneously when the throttle opening angle is reduced or the ignition timing is advanced, as a result of which the vehicle would suffer vibration like vibration caused by sudden, irregular acceleration. The engine control device 1 can prevent such vibration.

Other Embodiments

Although the ignition timing/throttle opening angle changing process of the above-described embodiment is such that a reduced throttle opening angle $F_{th}$ is determined on the basis of an engine rotation speed detection value $P_{ne}$, an accelerator position detection value $P_a$, and the reduced throttle opening angle map 33, the invention is not limited to this case. Instead, a reduced throttle opening angle $F_{th}$ may be determined on the basis of an engine rotation speed detection value $P_{ne}$, a throttle opening angle recognition value $P_{th}$, and the reduced throttle opening angle map 33. In this case, the reduced throttle opening angle map 33 is made a three-dimensional map indicating a relationship between the engine rotation speed, the throttle opening angle, and the reduced throttle opening angle.

Although the ignition timing/throttle opening angle changing process of the above embodiment is such that advanced ignition timing $F_{ig}$ is determined on the basis of an engine rotation speed detection value $P_{ne}$, a throttle opening angle recognition value $P_{th}$, and the advanced ignition timing map 34, the invention is not limited to this case. Instead, advanced ignition timing $F_{ig}$ may be determined on the basis of an engine rotation speed detection value $P_{ne}$, an accelerator position detection value $P_a$, and the advanced ignition timing map 34. In this case, the advanced ignition timing map 34 is made a three-dimensional map indicating a relationship between the engine rotation speed, the accelerator position, and the advanced ignition timing.

Although the ignition timing/throttle opening angle changing process of the above embodiment is such that a reduced throttle opening angle $F_{th}$ is determined on the basis of an engine rotation speed detection value $P_{ne}$, an accelerator position detection value $P_a$, and the reduced throttle opening angle map 33 and the throttle opening angle is reduced from an angle at a start of the ignition timing/throttle opening angle changing process to the reduced throttle opening angle $F_{th}$, the invention is not limited to this case. Instead, the ignition timing/throttle opening angle changing process may be such that a throttle opening angle reduction corresponding to the difference between a throttle opening angle recognition value $P_{th}$ and a reduced throttle opening angle $F_{th}$ is determined on the basis of an engine rotation speed detection value $P_{ne}$, an accelerator position detection value $P_a$ (or throttle opening angle recognition value $P_{th}$), and the reduced throttle opening angle map 33 and the throttle opening angle is reduced from an angle at a start of the ignition timing/throttle opening angle changing process by the determined throttle opening angle reduction. In this case, the reduced throttle opening angle map 33 is made a three-dimensional map indicating a relationship between the engine rotation speed, the accelerator position (or throttle opening angle), and the throttle opening angle reduction.

On the other hand, although the ignition timing/throttle opening angle changing process of the above embodiment is such that advanced ignition timing $F_{ig}$ is determined on the basis of an engine rotation speed detection value $P_{ne}$, a throttle opening angle recognition value $P_{th}$, and the advanced ignition timing map 34 and the ignition timing is advanced from timing at a start of the ignition timing/throttle opening angle changing process to the advanced ignition timing $F_{ig}$, the invention is not limited to this case. Instead, the ignition timing/throttle opening angle changing process may be such that an ignition timing advancement corresponding to the difference between an ignition timing recognition value $P_{ig}$ and advanced ignition timing $F_{ig}$ is determined on the basis of an engine rotation speed detection value P ne a throttle opening angle recognition value $P_{th}$ (or accelerator position detection value $P_a$), and the advanced ignition timing map 34 and the ignition timing is advanced from timing at a start of the ignition timing/throttle opening angle changing process by the ignition timing advancement. In this case, the advanced ignition timing map 34 is made a three-dimensional map indicating a relationship between the engine rotation speed, the accelerator position (or throttle opening angle), and the ignition timing advancement.

The reduced throttle opening angle map 33 which indicates the relationship between the engine rotation speed, the accelerator position (or throttle opening angle) and the throttle opening angle reduction and the advanced ignition timing map 34 which indicates the relationship between the engine rotation speed, the throttle opening angle (or accelerator position) and the ignition timing advancement are specific examples of the "ignition timing advancement/throttle opening angle reduction information".

A reduced throttle opening angle $F_{th}$ (or throttle opening angle reduction) and advanced ignition timing $F_{ig}$ (ignition timing advancement) may be determined on the basis of an engine rotation speed detection value $P_{ne}$, an accelerator position detection value $P_a$ (or throttle opening angle recognition value $P_{th}$), and the ignition timing/throttle opening angle target and advancement/reduction information. In this case, the ignition timing/throttle opening angle target and advancement/reduction information is made a data table indicating a relationship between the engine rotation speed, the accelerator position (or throttle opening angle), and the reduced throttle opening angle (or throttle opening reduction) and the advanced ignition timing (or ignition timing advancement).

Although in the ignition timing/throttle opening angle changing process of the above embodiment the reduced throttle opening angle map 33 and the advanced ignition timing map 34 are used as examples of the ignition timing/throttle opening angle target information which is used for determining a reduced throttle opening angle $F_{th}$ or advanced ignition timing $F_{ig}$, the invention is not limited to that case. The ignition timing/throttle opening angle target information may be, for example, a calculation formula for calculating a reduced throttle opening angle $F_{th}$ on the basis of an engine rotation speed detection value $P_{ne}$ and an accelerator position detection value $P_a$ or a calculation formula for calculating advanced ignition timing $F_{ig}$ on the basis of an engine rotation speed detection value $P_{ne}$ and a throttle opening angle recognition value $P_{th}$.

The change control process shown in FIG. 4 is just an example. Another method may be employed as the process for reducing the throttle opening angle gradually from an angle at a start of the ignition timing/throttle opening angle changing process to a reduced throttle opening angle $F_{th}$ and advancing the ignition timing gradually from timing at the start of the ignition timing/throttle opening angle changing process to advanced ignition timing $F_{ig}$.

Although in the above embodiment the change control process includes the process of preventing the throttle opening angle from becoming smaller than or equal to the throttle opening angle limit value of the fuel cutting control process in the ignition timing/throttle opening angle changing process, the invention is not limited to this case. A reduced throttle opening angle $F_{th}$ may be prevented from becoming smaller than or equal to the throttle opening angle limit value in determining the reduced throttle opening angle $F_{th}$ on the basis of an engine rotation speed detection value $P_{ne}$, an accelerator position detection value $P_a$, and the reduced throttle opening angle map 33. For example, this method can be implemented by forming a reduced throttle opening angle map 33 that does not include reduced throttle opening angles $F_{th}$ that are smaller than or equal to the throttle opening angle limit value.

When the accelerator angle is decreased slightly (e.g., its variation is 0% to −5%) during execution of the ignition timing/throttle opening angle changing process, the throttle opening angle may be prevented from being reduced so as to reflect this decrease of the accelerator angle. This measure makes it possible to prevent a phenomenon that when the driver has decreased the accelerator angle slightly during execution of the ignition timing/throttle opening angle changing process, the throttle opening angle becomes smaller than or equal to the throttle opening angle limit value accordingly to start the fuel cutting control process. As a result, lowering of the stability of running of the vehicle can be prevented. Alternatively, execution of the fuel cutting control process may be suspended during execution of the ignition timing/throttle opening angle changing process. This also makes it possible to prevent execution of the fuel cutting control process during execution of the ignition timing/throttle opening angle changing process and to thereby stabilize the manner of running of the vehicle.

Although, in the above embodiment, a body to be driven by the engine 2 is a vehicle such as a motorcycle, it may be any of other types of vehicles such as a motor tricycle and an automobile or even another kind of transportation means such as a ship.

The invention can be modified as appropriate without departing from the spirit and scope or the concept of the invention that can be read from the claims and the specification as a whole, and the technical concept of the invention encompasses engine control devices as so modified.

What is claimed is:

1. An engine control device comprising:
   an electronically controlled throttle which controls a flow rate of air-fuel mixture flowing into a cylinder of an engine by controlling a throttle opening angle electronically;
   an ignition device which ignites an air-fuel mixture existing in the cylinder; and
   an engine control unit which executes an ignition timing/throttle opening angle changing process of controlling the ignition device and the electronically controlled throttle while an operation of a body to be driven by the engine is in a steady state so as to advance a timing of ignition of an air-fuel mixture existing in the cylinder and to reduce the throttle opening angle so that a torque after a change to a reduced throttle opening angle and advanced ignition timing that is obtained at any time point while the body is in a steady traveling state is always equal to a torque before a change to the reduced throttle opening angle and the advanced ignition timing that is obtained at the same time point.

2. The engine control device according to claim 1, further comprising:
   an engine rotation speed detection unit which detects a rotation speed of the engine;
   a throttle opening angle detection unit which detects a throttle opening angle; and
   a storage unit which is stored with ignition timing/throttle opening angle target information indicating a relationship between the rotation speed, the throttle opening angle, advanced ignition timing as target ignition timing of the ignition timing/throttle opening angle changing process, and a reduced throttle opening angle as a target throttle opening angle of the ignition timing/throttle opening angle changing process, wherein:
   the engine control unit determines advanced ignition timing and a reduced throttle opening angle to be attained while a torque at a time when the operation of the body to be driven by the engine has been rendered in a steady state is maintained based on a rotation speed detected by the engine rotation speed detection unit when the operation of the body to be driven by the engine has been rendered in a steady state, a throttle opening angle detected by the throttle opening angle detection unit when the operation of the body to be driven by the engine has been rendered in a steady state, and the ignition timing/throttle opening angle target information, and advances the ignition timing to the determined advanced ignition timing and reduces the throttle opening angle to the determined reduced throttle opening angle.

3. The engine control device according to claim 1, further comprising:
   an engine rotation speed detection unit which detects a rotation speed of the engine;
   a throttle opening angle detection unit which detects a throttle opening angle; and
   a storage unit which is stored with ignition timing advancement/throttle opening angle reduction information indicating a relationship between the rotation speed, the throttle opening angle, an ignition timing advancement by which the ignition timing is changed in the ignition timing/throttle opening angle changing process, and a throttle opening angle reduction by which the throttle opening angle is changed in the ignition timing/throttle opening angle changing process, wherein:
   the engine control unit determines an ignition timing advancement and a throttle opening angle reduction to be attained while a torque at a time when the operation of the body to be driven by the engine has been rendered in a steady state is maintained based on a rotation speed detected by the engine rotation speed detection unit when the operation of the body to be driven by the engine has been rendered in a steady state, a throttle opening angle detected by the throttle opening angle detection unit when the operation of the body to be driven by the engine has been rendered in a steady state, and the ignition timing advancement/throttle opening angle reduction information, and advances the ignition timing by the determined ignition timing advancement and reduces the throttle opening angle by the determined throttle opening angle reduction.

4. The engine control device according to claim 1, further comprising:
   an engine rotation speed detection unit which detects a rotation speed of the engine;
   an accelerator position detection unit which detects an accelerator position; and
   a storage unit which is stored with ignition timing/throttle opening angle target information indicating a relationship between the rotation speed, the accelerator position, advanced ignition timing as target ignition timing of the ignition timing/throttle opening angle changing process, and a reduced throttle opening angle as a target throttle opening angle of the ignition timing/throttle opening angle changing process, wherein:
   the engine control unit determines advanced ignition timing and a reduced throttle opening angle to be attained while a torque at a time when the operation of the body to be driven by the engine has been rendered in a steady state is maintained based on a rotation speed detected by the engine rotation speed detection unit when the operation of the body to be driven by the engine has been rendered in a steady state, an accelerator position detected by the accelerator position detection unit when the operation of the body to be driven by the engine has been rendered in a steady state, and the ignition timing/throttle opening angle target information, and advances the ignition timing to the determined advanced ignition timing and reduces the throttle opening angle to the determined reduced throttle opening angle.

5. The engine control device according to claim 1, further comprising:
- an engine rotation speed detection unit which detects a rotation speed of the engine;
- an accelerator position detection unit which detects an accelerator position; and
- a storage unit which is stored with ignition timing advancement/throttle opening angle reduction information indicating a relationship between the rotation speed, the accelerator position, an ignition timing advancement by which the ignition timing is changed in the ignition timing/throttle opening angle changing process, and a throttle opening angle reduction by which the throttle opening angle is changed in the ignition timing/throttle opening angle changing process, wherein:
- the engine control unit determines an ignition timing advancement and a throttle opening angle reduction to be attained while a torque at a time when the operation of the body to be driven by the engine has been rendered in a steady state is maintained based on a rotation speed detected by the engine rotation speed detection unit when the operation of the body to be driven by the engine has been rendered in a steady state, an accelerator position detected by the accelerator position detection unit when the operation of the body to be driven by the engine has been rendered in a steady state, and the ignition timing advancement/throttle opening angle reduction information, and advances the ignition timing by the determined ignition timing advancement and reduces the throttle opening angle by the determined throttle opening angle reduction.

6. The engine control device according to claim 1, wherein, in the ignition timing/throttle opening angle changing process, the engine control unit controls the electronically controlled throttle so that the throttle opening angle does not become smaller than or equal to a throttle opening angle at which a fuel cutting control is started.

7. The engine control device according to claim 2, wherein, in the ignition timing/throttle opening angle changing process, the engine control unit controls the electronically controlled throttle so that the throttle opening angle does not become smaller than or equal to a throttle opening angle at which a fuel cutting control is started.

8. The engine control device according to claim 3, wherein, in the ignition timing/throttle opening angle changing process, the engine control unit controls the electronically controlled throttle so that the throttle opening angle does not become smaller than or equal to a throttle opening angle at which a fuel cutting control is started.

9. The engine control device according to claim 4, wherein, in the ignition timing/throttle opening angle changing process, the engine control unit controls the electronically controlled throttle so that the throttle opening angle does not become smaller than or equal to a throttle opening angle at which a fuel cutting control is started.

10. The engine control device according to claim 5, wherein, in the ignition timing/throttle opening angle changing process, the engine control unit controls the electronically controlled throttle so that the throttle opening angle does not become smaller than or equal to a throttle opening angle at which a fuel cutting control is started.

11. The engine control device according to claim 1, wherein the body to be driven by the engine is a vehicle, and the engine control unit executes the ignition timing/throttle opening angle changing process when the vehicle has been rendered in a cruising state.

12. The engine control device according to claim 2, wherein the body to be driven by the engine is a vehicle, and the engine control unit executes the ignition timing/throttle opening angle changing process when the vehicle has been rendered in a cruising state.

13. The engine control device according to claim 3, wherein the body to be driven by the engine is a vehicle, and the engine control unit executes the ignition timing/throttle opening angle changing process when the vehicle has been rendered in a cruising state.

14. The engine control device according to claim 4, wherein the body to be driven by the engine is a vehicle, and the engine control unit executes the ignition timing/throttle opening angle changing process when the vehicle has been rendered in a cruising state.

15. The engine control device according to claim 5, wherein the body to be driven by the engine is a vehicle, and the engine control unit executes the ignition timing/throttle opening angle changing process when the vehicle has been rendered in a cruising state.

16. The engine control device according to claim 6, wherein the body to be driven by the engine is a vehicle, and the engine control unit executes the ignition timing/throttle opening angle changing process when the vehicle has been rendered in a cruising state.

17. The engine control device according to claim 7, wherein the body to be driven by the engine is a vehicle, and the engine control unit executes the ignition timing/throttle opening angle changing process when the vehicle has been rendered in a cruising state.

18. The engine control device according to claim 8, wherein the body to be driven by the engine is a vehicle, and the engine control unit executes the ignition timing/throttle opening angle changing process when the vehicle has been rendered in a cruising state.

19. The engine control device according to claim 9, wherein the body to be driven by the engine is a vehicle, and the engine control unit executes the ignition timing/throttle opening angle changing process when the vehicle has been rendered in a cruising state.

20. The engine control device according to claim 10, wherein the body to be driven by the engine is a vehicle, and the engine control unit executes the ignition timing/throttle opening angle changing process when the vehicle has been rendered in a cruising state.

* * * * *